Oct. 14, 1969  K. F. ZIEHM, JR  3,472,133
EDGING STRIPS
Filed Sept. 25, 1967
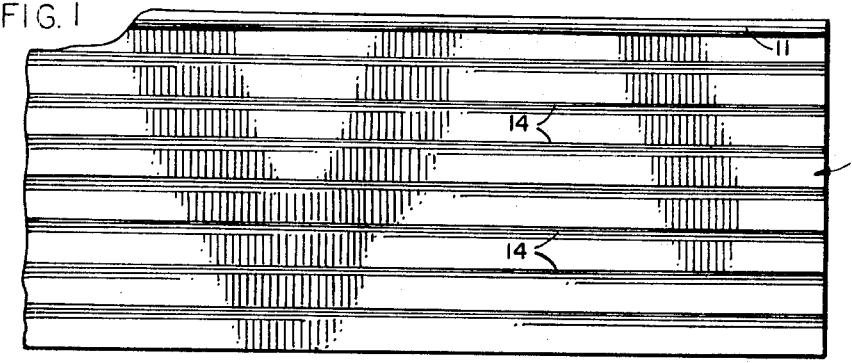
FIG. 1
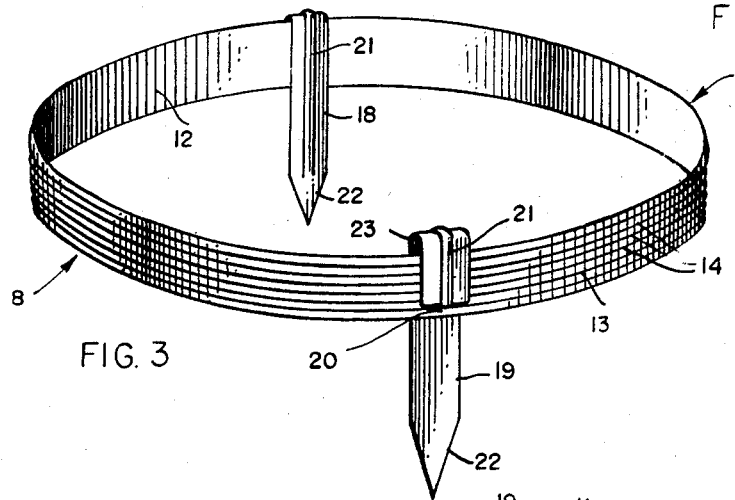
FIG. 3
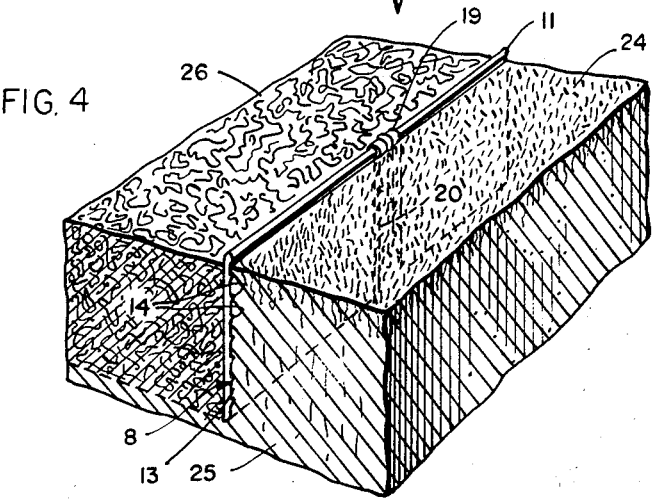
FIG. 4
FIG. 2
INVENTOR:
KURT F. ZIEHM, JR.
BY
Marzall, Johnston, Cook & Root
ATT'YS

United States Patent Office 3,472,133
Patented Oct. 14, 1969

3,472,133
EDGING STRIPS
Kurt F. Ziehm, Jr., Arlington Heights, Ill., assignor to Precision Extrusions, Inc., Bensenville, Ill., a corporation of Illinois
Filed Sept. 25, 1967, Ser. No. 670,176
Int. Cl. E01c *11/02;* A01g *1/08*
U.S. Cl. 94—17                    1 Claim

ABSTRACT OF THE DISCLOSURE

Extruded aluminum strips useful as landscaping and roadway edging with longitudinal ribs on one face and horizontal, substantially flat, upper ledges on said ribs to form retaining lips and asphalt or stone roadways or walkways formed with said strips as the forms for the edges thereof.

BACKGROUND OF THE INVENTION

Edging for landscaping purposes is used to prevent the creeping of grass, the spillover of gravel or dirt, and as decorative highlights for flower beds, pathways, garden plots and tree or shrub plantings. Wooden boards or strips have been used for this purpose for many years. Recently a transversely corrugated metal stripping has gained popularity as an edging material for landscaping.

The longitudinal edges of these transversely corrugated lightweight metal strips have relatively sharp edges which tend to cut the hands or snag the clothes of the person installing the edging. Furthermore, these strips are relatively easily bent or cut along the upper projecting edges thereof by lawn tools or the like.

BRIEF DESCRIPTION OF THE INVENTION

The invention herein pertains to improvements in metal strips useful in landscaping or in the forming and retention of the edges of roadways, walkways, or the like. Briefly, the edging of the invention comprises elongated, extruded aluminum strips having a rounded bead extending along the upper edge thereof to provide a smooth, strength-imparting bead on the exposed upper edge and a plurality of integral parallel longitudinal ribs spaced vertically along at least one side thereof. These ribs have a substantially flat upper ledge to form retaining lips adapted to hold the edging in earth or the like which is packed against the ribbed side. In a preferred form of the invention, these ribs have elongated, transversely arcuate undersides connecting the outer edges of the ribs with the major plane of the ribbed side of the strips.

BRIEF DESCRIPTION OF THE DRAWINGS

Preferred embodiments of the invention are illustrated in the drawings, wherein:

FIG. 1 is a front elevation of an end fragment of the preferred embodiment;

FIG. 2 is an enlarged sectional view thereof;

FIG. 3 is a perspective view showing said edging in the form of a ring with hold-down and splicing stakes thereon; and FIG. 4 is a perspective view of a fragment of a road or walkway and contiguous lawn, with the edging strips of the invention employed to define the border of the lawn along the edge of said road or walkway.

DESCRIPTION OF THE PREFERRED EMBODIMENTS

Referring to the drawings, edging strip material embodying the present invention comprises elongated, extruded aluminum strips 8 adapted to be disposed along the edges of roadways or walkways for purposes of edge retention, and in landscaping, for defining the edges of flower beds, lawns, garden plots, tree or shrub plantings and the like. The strip material may be provided in variety of thicknesses to suit various edging requirements. Preferably, a heavy gauge strip may have overall thickness of the order of ¼″, as shown in solid lines in FIG. 2, the sectional configuration of ³⁄₁₆″ and ⅛″ gauge strips being indicated in dashed lines, respectively at 9 and 10, in FIG. 2; and the material is preferably provided in widths of the order of five inches. The strips, especially in the lighter gauges, can be easily bent into regular or irregular shapes of transverse curvature for outlining the curved edges of flower beds, garden plots, and tree or shrub planting. Even the quarter inch material can be curved to conform with gentle curves, as of roads and walkways. The upper edge of the strip preferably is formed with a bead 11 of appreciable size which provides a smooth, exposed, upper edge on the strip when it has been laid in the soil. One side or face 12 of the illustrated embodiment is smooth. It may, however, without departing from the invention, be provided with longitudinal ribs of the sort hereinafter described.

The opposite side or face 13 of the edging strips, however, is formed with integral, vertically spaced, parallel and longitudinally extending ribs 14, providing substantially flat, horizontal ledges 15 which act as retaining lips to hold the strip material in earth or the like when packed against the side 13. In the preferred form of the invention, the ribs 14 have elongated, transversely arcuate undersides 16 connecting the outer edges of the ribs with the main plane of the face 13.

The lighter gauge edging strips of the invention, as aforesaid, can readily be bent transversely to form regular or more or less sharply irregular curvatures. As shown in FIG. 3, the edging strips of the invention may be bent into a ring 17 of small diameter to outline a circular flower bed, a tree or shrub planting, or the like.

In linear or curved form, the edging strips of the invention may be held in place by means of hold-down stakes 18 disposed at intervals therealong. Somewhat larger and wider splicing stakes 19 of the same general shape as the hold-down stakes 18 may be applied across abutting edges 20 of a strip or strips. The stakes 18 and 19 preferably have a longitudinal, strengthening rib 21, a pointed tip 22, and a U-shaped head portion 23 adapted to fit over the upper edge of the edging strips.

As shown in FIG. 4, the edging strips of the invention may be utilized to define the edges of a stone or asphalt road or walkway, and to separate the same from an adjacent area, such as a lawn. For such use, the edging strip material may be and preferably is of sufficiently heavy gauge that it is not easily bendable. Such material may be placed prior to the pouring of an asphalt pavement, and may serve as an edge construction form for retaining the flowable asphalt until it has set. The edging can be left after the asphalt has hardened so that it functions as a retainer strip to prevent edge erosion of the asphalt pavement.

As shown in FIG. 4, the ribbed side 13 faces away from the asphalt pavement. When earth 25 is packed thereagainst, the ribs 14 function as strip-retaining lips to hold the edging material in position with its bead 11 slightly above the surface of the asphalt pavement or walkway 26 and the adjacent lawn portion 24.

The edging strips are preferably installed by placing them in a shallow trench and packing in earth to a depth such that the bead 11 projects above the surface in the order of ¼ inch to ½ inch, or, if the earth is sufficiently soft, the strip material may be forced or pounded downwardly into position. The strip material may be sawed easily into desired lengths and, where required, may be bent into regular or irregular shapes prior to installation.

Use of hold-down stakes 18 and splicing stakes 19, though usually preferred, is optional.

It is thought that the invention and its attendant advantages will be fully understood from the foregoing description, and it is obvious that numerous changes may be made in the form, construction and arrangement of the several parts without departing from the spirit or scope of the invention or sacrificing any of its attendant advantages, the forms herein disclosed being preferred embodiments for the purpose of demonstrating the invention.

The invention is hereby claimed as follows:

1. Edging useful in landscaping and other uses comprising an elongated, extruded aluminum strip, said strip, in vertical orientation thereof, having a rounded bead extending along the longitudinal, upper edge thereof, one vertical face of said strip being a smooth face and the opposite vertical face having a main plane and a plurality of integral, parallel, longitudinal ribs spaced vertically along and extending the length of said opposite face, said ribs respectively having a substantially flat, horizontal, upper ledge to provide strip-retaining lips adapted to hold said edging in earth or the like which is packed against said side, said respective upper ledges projecting from said main plane of said opposite face at right angles thereto, and said ribs further respectively having elongated, transversely arcuate undersides extending transversely arcuately from the respective outer edges of said upper ledges and merging with the said main plane of said opposite face.

References Cited

UNITED STATES PATENTS

| 1,068,739 | 7/1913 | Cogswell | 94—5 |
| 2,086,373 | 7/1937 | Vogel | 94—17 |
| 2,094,519 | 9/1937 | Ballard | 47—33 |
| 2,098,714 | 11/1937 | Aubrey | 94—17 |

JACOB L. NACKENOFF, Primary Examiner

U.S. Cl. X.R.

47—33; 94—31